(12) United States Patent
Otsuka

(10) Patent No.: US 7,761,615 B2
(45) Date of Patent: Jul. 20, 2010

(54) INFORMATION-PROCESSING SYSTEM

(75) Inventor: Naoki Otsuka, Konan (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 968 days.

(21) Appl. No.: 11/534,809

(22) Filed: Sep. 25, 2006

(65) Prior Publication Data

US 2007/0087778 A1    Apr. 19, 2007

(30) Foreign Application Priority Data

Sep. 30, 2005   (JP) .............................. 2005-287871

(51) Int. Cl.
*G06F 3/00* (2006.01)
*G06F 13/00* (2006.01)
(52) U.S. Cl. ............................ 710/14; 710/15; 710/104
(58) Field of Classification Search ............... 710/8–15, 710/17–19, 104–105; 713/1, 100
See application file for complete search history.

(56) References Cited

U.S. PATENT DOCUMENTS

| 6,292,852 | B1 * | 9/2001 | Bodo et al. | .................... 710/20 |
| 2003/0007384 | A1 * | 1/2003 | Shimizu | ................ 365/185.03 |
| 2005/0289287 | A1 * | 12/2005 | Shin et al. | ....................... 711/1 |
| 2006/0067218 | A1 * | 3/2006 | Clermidy et al. | ............ 370/230 |
| 2006/0085567 | A1 * | 4/2006 | Takada et al. | .................. 710/15 |
| 2007/0005949 | A1 * | 1/2007 | Ho et al. | ........................ 713/2 |

FOREIGN PATENT DOCUMENTS

| JP | H07-020999 A | 1/1995 |
| JP | 1996314651 A | 11/1996 |
| JP | 1998334142 A | 12/1998 |
| JP | 2002293412 A | 10/2002 |
| JP | 2003-308102 A | 10/2003 |
| JP | 2004-078401 A | 3/2004 |

OTHER PUBLICATIONS

Japanese Patent Office, Notification of Reasons of Rejection for Japanese Application No. 2005-287871 (counterpart to above-captioned U.S. patent application), dispatched on Jun. 9, 2008.

* cited by examiner

*Primary Examiner*—Christopher B Shin
(74) *Attorney, Agent, or Firm*—Baker Botts L.L.P.

(57) ABSTRACT

An information-processing system comprises an information-processing device including a plurality of communication interfaces, a first storing system configured to store first setting values to be configured for each of the plurality of communication interfaces and second setting values configurable in common for the plurality of communication interfaces for each of the plurality of communication interfaces, a second storing system configured to store the second setting values, a setting mode determining system configured to select one of a first setting mode where setting values are configured for each of the plurality of communication interfaces and a second setting mode where setting values configurable in common are configured in common for the plurality of communication interfaces, a reading system configured to read out a setting value from the first storing system and second storing system, and an updating system configured to update the setting value read out by the reading system.

8 Claims, 12 Drawing Sheets

| PRAdmin Professional | | | |
|---|---|---|---|
| Node Name | Log | Node Address | Printer Status |
| PRN_4300A2 | | 18.134.100.133 | 01/01 07 : 06 : fax |
| PRN_435BFD | | 18.134.43.246 | Connection Error |
| PRN_480052 | | 18.134.43.80 | Connection Error |
| PRN_480105 | | 18.134.150.138 | SLEEP |
| PRN_487BD2 | | 18.134.100.1 | Connection Error |
| PRN_48A361 | | 18.134.100.35 | 04/08 11 : 19 fax |
| PRN_48B200 | | 18.134.43.133 | Connection Error |
| PRN_48B430 | | 18.134.100.1 | |
| PRN_48D97C | | 18.134.100.14 | |
| PRN_48D97D | | 18.134.100.29 | |
| PRN_600300 | | 18.134.100.20 | |
| PRN_600356 | | 18.134.100.15 | |
| PRN_6007A0 | | 18.134.41.223 | |
| PRN_72B8BA | | 18.134.41.215 | |
| PRN_7B0131_LD... | | 18.134.43.157 | |
| Pro6050DN | | 18.134.41.236 | |
| ITOH-ZL2FB | | 18.134.100.4 | |
| NPIC4B4BB | | 18.134.150.4 | |

Context menu:
- Configure Print Server  Ctrl + C
- Configure Interface
- NetWare Quick Steup
- Printer Home Page
- Get Current Status
- Start Printing Logging
- Import Auto Dial
- Send Auto Dial
- Delete Device  DEL
- Send File
- Load Firmware  Ctrl + L

MFP I/F1 →
10 { I/F2 →
     I/F3 →

FIG. 5

COMMUNICATION SETTINGS

| General | Control | Services | TCP/IP | POP3/SMTP |

NetBIOS | Configure Printer | Notification

IP Address: 18.134.100.182
Subnet Mask: 255.255.0.0
Gateway: 18.134.254.1254
Timeout: 60 minutes
Boot Tries: 3

IP Config:
- ● Auto
- ○ Static
- ○ DHCP
- ○ RARP
- ○ Bootp
- ☑ APIPA

RARP Flags:
- ☐ No Router
- ☐ No Subnet

DNS Server Method:
- ● Auto
- ○ Static

Primary DNS Server IP Address: 188.151.111.182
Secondary DNS Server IP Address: 188.151.111.183
Timeout for Gateway: 5 seconds

[OK] [Cancel] [Help]

INFORMATION-PROCESSING SYSTEM

CROSS-REFERENCE TO RELATED APPLICATIONS

This application claims priority under 35 U.S.C. §119 from Japanese Patent Application No. 2005-287871, filed on Sep. 30, 2005. The entire subject matter of the application is incorporated herein by reference.

BACKGROUND

1. Technical Field

The following description relates to one or more information-processing systems including an information-processing device provided with a plurality of communication interfaces.

2. Related Art

A network device, such as a computer and printer, provided with a plurality of communication interfaces is known. For example, there is disclosed in Japanese Patent Provisional Publication No. HEI 8-314651 a printing device provided with a plurality of communication interfaces. There can be cited as another kind of network device provided with a plurality of communication interfaces a Multi Function Peripheral (MFP) having a plurality of functions such as a printing function, a copying function, a facsimile function, and the like. Network settings are required to be configured for those kinds of network devices.

Specifically, in order to use a network connected with each of the plurality of communication interfaces of the network device, communication settings such as TCP/IP, SMTP, POP3, NetBIOS, Netware, and the like have to be configured for each of the plurality of communication interfaces.

It imposes a burden on an administrator to configure such network settings for each of the plurality of communication interfaces. When the administrator forgets to configure the settings, or inputs an improper setting value, it might make the communication impossible. Accordingly, when setting values in common for the plurality of communication interfaces are once inputted for one of the plurality of communication interfaces, the setting values are desired to be reflected in the setting values for each of the other communication interfaces. However, it depends on judgment of the administrator whether the setting values are to be in common for the plurality of communication interfaces.

SUMMARY

Aspects of the present invention are advantageous in that there can be provided one or more improved information-processing systems that can reduce a burden imposed on an administrator in configuring network settings for each of a plurality of communication interfaces provided in an information-processing device.

BRIEF DESCRIPTION OF THE ACCOMPANYING DRAWINGS

FIG. 5 shows a setting process screen image in accordance with one or more aspects of the present invention.

FIG. 8 is a setting screen image for the TCP/IP in accordance with one or more aspects of the present invention.

Figure 12:
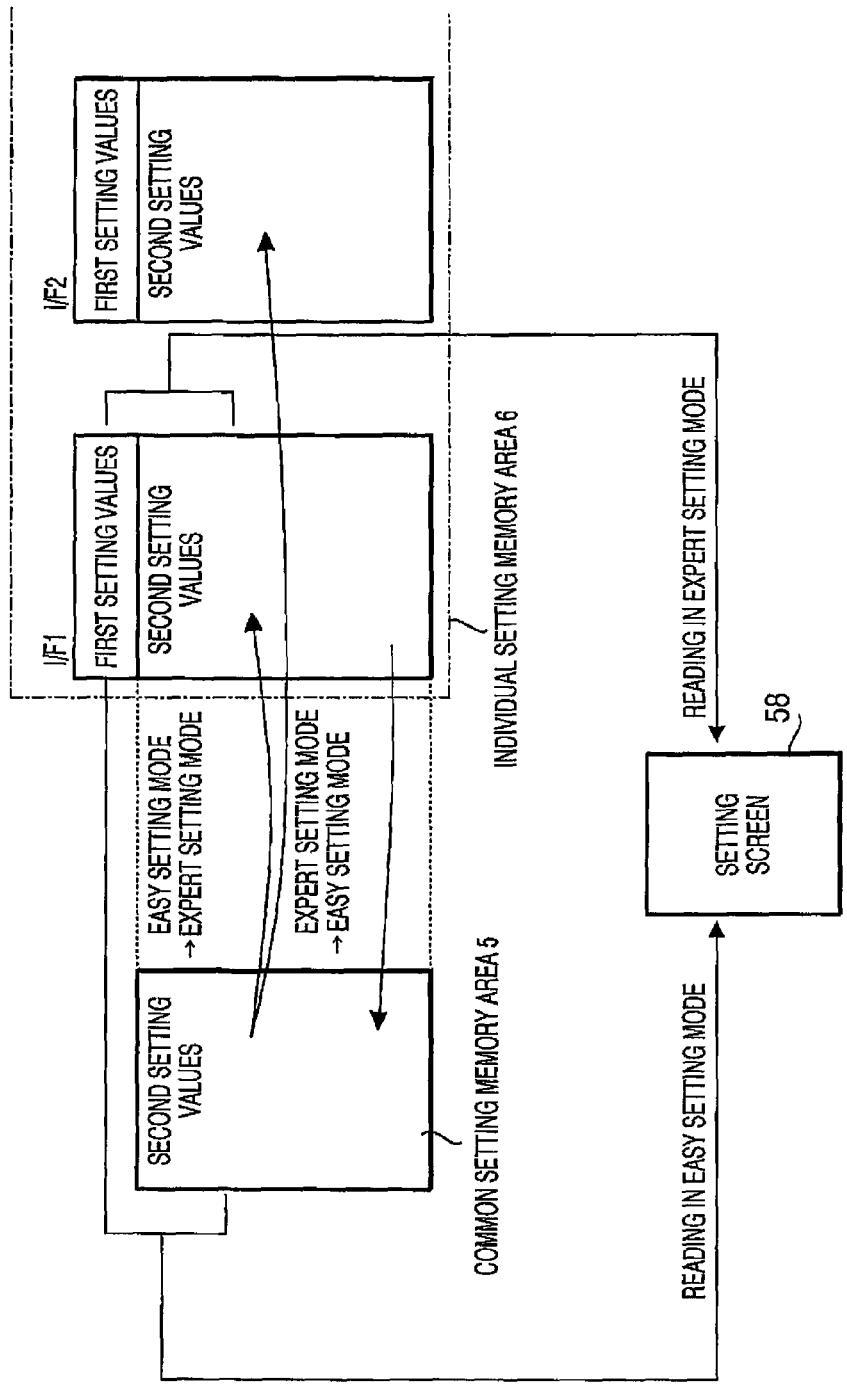

FIG. 12 schematically shows a communication setting process in a summarized manner in accordance with one or more aspects of the present invention.

Figure 13:
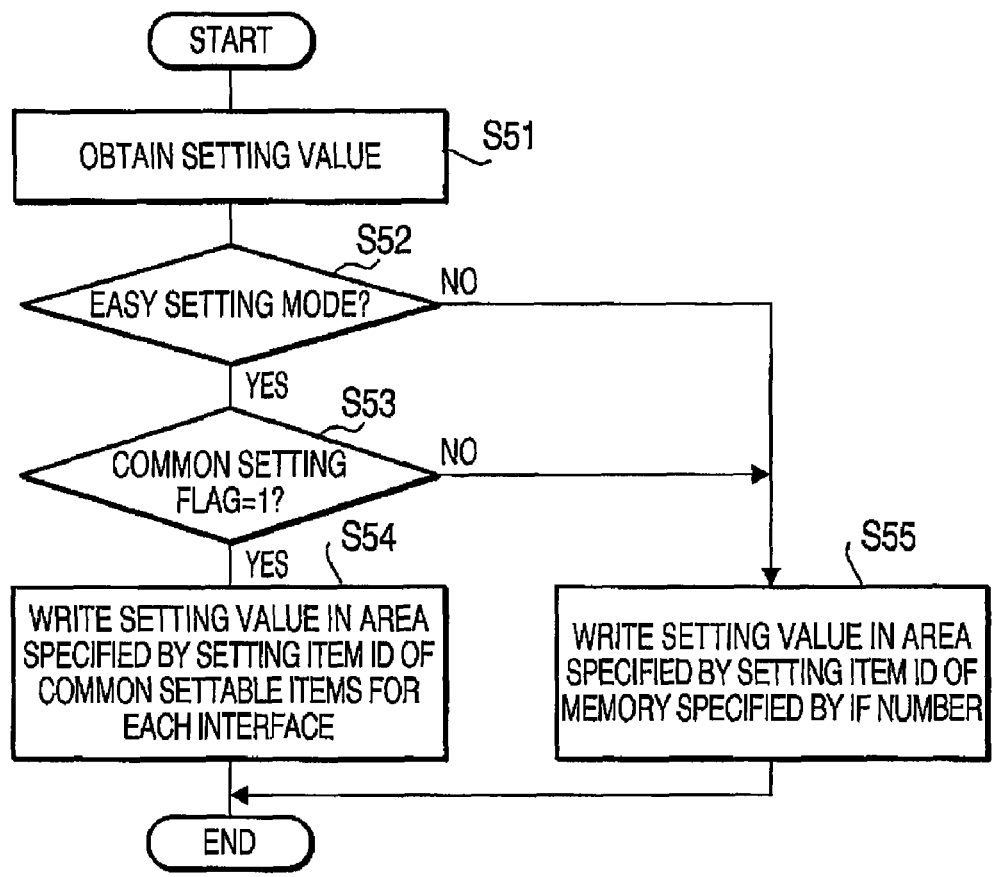

FIG. 13 is a flowchart showing a procedure of a process of writing a setting value in accordance with another aspect of the present invention.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

General Overview

According to aspects of the present invention, there is provided a information-processing system, which comprises: an information-processing device including a plurality of communication interfaces; a first storing system configured to store first setting values to be configured for each of the plurality of communication interfaces and second setting values configurable in common for the plurality of communication interfaces for each of the plurality of communication interfaces; a second storing system configured to store the second setting values; a setting mode determining system configured to select one of a first setting mode where setting values are configured for each of the plurality of communication interfaces and a second setting mode where setting values configurable in common are configured in common for the plurality of communication interfaces; a reading system configured to read out a setting value from the first storing system and second storing system; and an updating system configured to update the setting value read out by the reading system.

Optionally, the reading system may be configured to read out at least one of the first setting values stored in the first storing system and the second setting values stored in the first storing system, in response to the first setting mode being selected by the setting mode determining system. Further optionally, the reading system may be configured to read out at least one of the first setting values stored in the first storing system and the second setting values stored in the second storing system, in response to the second setting mode being selected by the setting mode determining system.

According to some aspects, in the first setting mode, the first setting values and the second setting values stored in the first storing system for each of the plurality of communication interfaces are read out. Meanwhile, in the second setting mode, the first setting values to be individually configured are read out from the first storing system, and the second setting values configurable in common are read out from the second storing system. The updating system updates each of the setting values read out from the first storing system or the second storing system. Namely, when the setting values are updated in the second setting mode, the second setting values stored in the second storing system are updated. Therefore, even though the second setting values are not configured for each of the plurality of communication interfaces, the second setting values are updated for each of the other communication interfaces. In the meantime, even though setting values to be configured are configurable in common, the setting values are sometimes desired to be configured for each of the plurality of communication interfaces. In such a case, by updating the setting values in the first setting mode, the second setting values read out from the first storing system are updated. Thereby, according to the information-processing system configured as above, only with a setting mode being selected by a user, the settings are configured in a user-intended setting mode. Especially, for a beginner, as the common setting can be available in the second setting mode, necessary operations are simpler and easier, and such an operation mistake that necessary setting values are not configured or improper settings are configured can be prevented. It is noted that a portion that stores the second setting values for an arbitrary communication interface in the first storing system can be utilized as the second storing system.

Optionally, the information-processing system may further comprises a first reflecting system configured to reflect the second setting values stored in the second storing system in the second setting values stored in the first storing system for each of the plurality of communication interfaces in response to the setting mode being changed from the second setting mode to the first setting mode.

According to the information-processing system configured as above, the second setting values stored in the second storing system are reflected in the second setting values stored in the first storing system by the first reflecting system. Therefore, the second setting values stored in the first storing system can previously be configured before configuring the settings for each of the plurality of communication interfaces. Thereby, the user is only required to modify the setting values to be individually configured for each of the plurality of communication interfaces, and can leave the setting values configurable in common as they are. Accordingly, the user can change only the setting values to be modified by the user in particular.

Optionally, the information-processing system may further comprises a second reflecting system configured to reflect the second setting values stored in the first storing system in the second setting values stored in the second storing system in response to the setting mode being changed from the first setting mode to the second setting mode.

According to the information-processing system configured as above, the second reflecting system reflects the second setting values stored in the first storing system in the second setting values stored in the second storing system. Therefore, as the user can utilize the second setting values as setting values configurable in common, the user can easily configure the second setting values stored in the second storing system.

Further optionally, the information-processing system may further comprises a reflected target determining system configured to specify a communication interface of which the second setting values stored in the first storing system are to be reflected in the second setting values stored in the second storing system, and the second setting values stored in the second storing system to be reflected by the second reflecting system may be the second setting values of the communication interface specified by the reflected target determining system stored in the first storing system.

According to the information-processing system configured as above, the reflected target determining system can determine a communication interface of which the second setting values stored in the first storing system are to be reflected in the second setting values stored in the second storing system. Therefore, the second setting values configured for an intended communication interface can be utilized as the second setting values in the second storing system. Thereby, the second setting values in the second storing system can easily be configured.

According to another aspect of the present invention, there is provided an information-processing system, which comprises: an information-processing device including a plurality of communication interfaces; a first storing system configured to store first setting values to be configured for each of the plurality of communication interfaces and second setting values configurable in common for the plurality of communication interfaces associated with one of the plurality of communication interfaces; a second storing system configured to store the first setting values and the second setting values associated with another one of the plurality of communication interfaces; a setting mode determining system configured to select one of a first setting mode where setting values are configured for each of the plurality of communication interfaces and a second setting mode where setting values configurable in common are configured in common for the plurality of communication interfaces; a reading system configured to read out one of the first setting values and second setting values from the first storing system; and an updating system configured to update the setting value read out by the reading system. The updating system is configured to update the setting values stored in the first storing system, in response to the first setting mode being selected by the setting mode determining system. The updating system is configured to update the second setting values stored in the first storing system and the second setting values stored in the second storing system, in response to the second setting mode being selected by the setting mode determining system and the second setting values being specified as the setting values to be updated by the updating system.

According to the information-processing system configured as above, only by selecting the second setting mode, the second setting values are updated for each of the other communication interfaces without configuring the second setting values for each of the plurality of communication interfaces. Meanwhile, even though setting values to be configured are configurable in common, the setting values are sometimes desired to be configured for each of the plurality of communication interfaces. In such a case, by updating the setting values in the first setting mode, the second setting values in the storing systems corresponding to each of the plurality of communication interfaces are updated. Thereby, according to the configuration as above, only with a setting mode being selected by a user, the settings are configured in a user-intended setting mode. Especially, for a beginner, as the common setting can be available in the second setting mode, necessary operations are simpler and easier, and such an operation mistake that necessary setting values are not configured or improper settings are configured can be prevented.

According to a further aspect of the present invention, there is provided an information-processing system, which comprises: an information-processing device including a plurality of communication interfaces; a first storing system configured to store first setting values to be configured for each of the plurality of communication interfaces and second setting values configurable in common for the plurality of communication interfaces for each of the plurality of communication interfaces; a second storing system configured to store the second setting values; a setting mode determining system configured to select one of a first setting mode where setting values are configured for each of the plurality of communication interfaces and a second setting mode where setting values configurable in common are configured in common for the plurality of communication interfaces; a reading system configured to read out a setting value from the first storing system and second storing system; and an updating system configured to update the setting value read out by the reading system.

According to some aspects, even though the second setting values are not configured for each of the plurality of communication interfaces, the second setting values can be updated for each of the other communication interfaces, when the second setting mode is selected. In the meantime, even though setting values to be configured are configurable in common, the setting values are sometimes desired to be configured for each of the plurality of communication interfaces. In such a case, with the first setting mode being selected, the second setting values in the first storing system can be updated for each of the plurality of communication interfaces. Thereby, according to the information-processing system configured as above, only with a setting mode being selected by a user, the settings are configured in a user-intended setting mode. Especially, for a beginner, as the common setting can be available in the second setting mode, necessary operations are simpler and easier, and such an operation mistake that necessary setting values are not configured or improper settings are configured can be prevented.

Illustrative Aspects

Hereinafter, illustrative aspects according to the present invention will be described with reference to the accompanying drawings. It is noted that an information-processing device according to the present invention includes a computer provided with a plurality of communication interfaces, a facsimile machine, and a Multi Function Peripheral (MFP) having a plurality of functions such as a FAX function, mail sending function, printing function, scanning function, copying function. In the below-mentioned illustrative aspects, an MFP provided with the FAX function and a terminal device connected with the MFP will be explained as information-processing devices.

Figure 1:
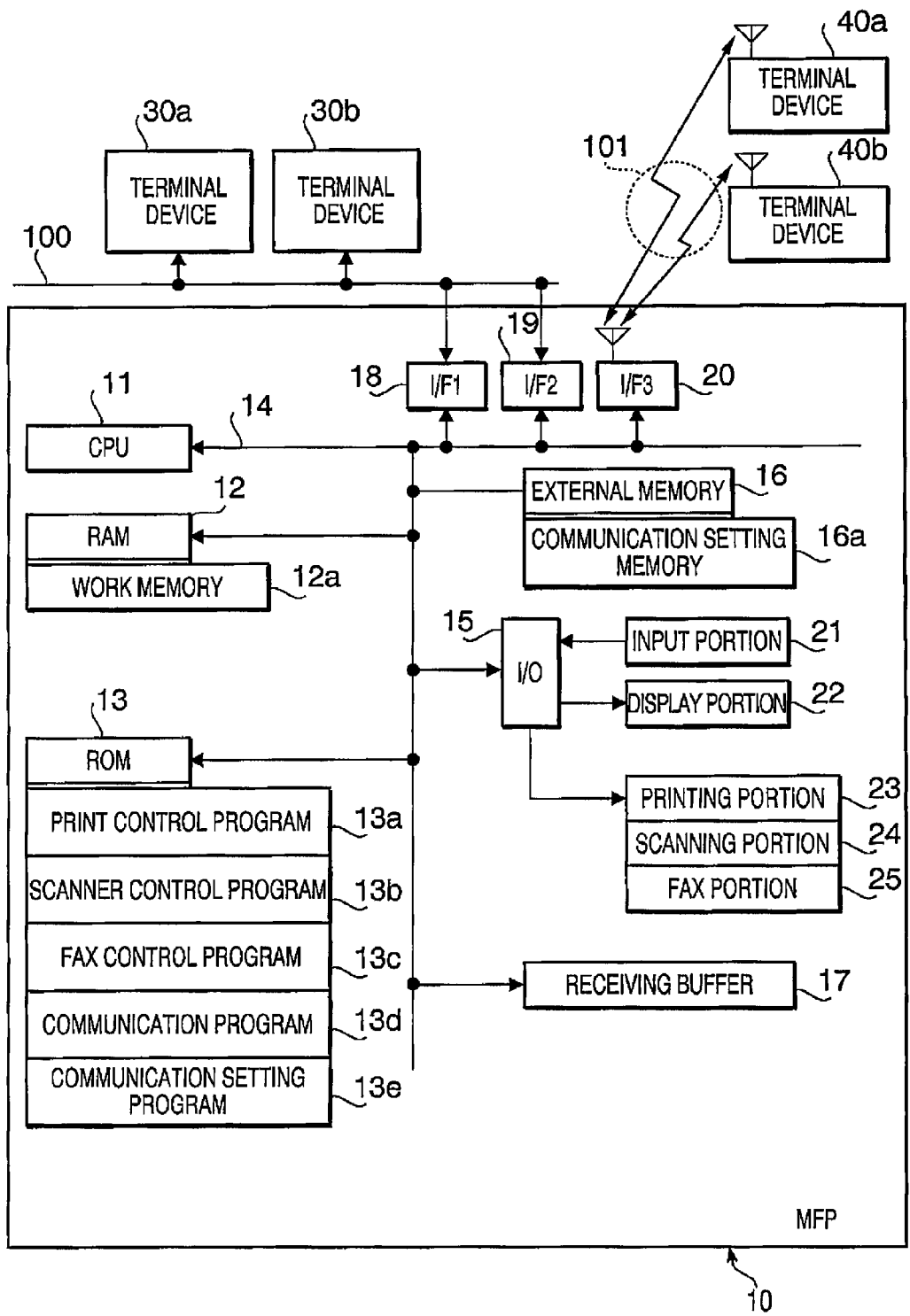
FIG. 1 is a block diagram exemplifying an electrical configuration of a Multi Function Peripheral (MFP) in accordance with one or more aspects of the present invention.

FIG. 1 schematically shows an example of an information-processing device according to one or more aspects of the present invention. An MFP 10 as the information-processing device is connected with terminal devices 30a and 30b via a wired communication network 100. There can be employed for the wired communication network 100 a serial communication cable, parallel communication cable, wired LAN cable, or the like. In the aspects, the wired LAN cable is employed as the wired communication network 100. Further, the wired communication network 100 may be connected with a plurality of MFPs 10.

In addition, the MFP 10 is connected with the terminal devices 40a and 40b via a wireless communication network 101. There can be used for the wireless communication network 101 a wireless LAN, IEEE 802.11x, Bluetooth (trademark registered) or the like. The MFP 10 is configured with: a CPU 11; a RAM 12 having a work memory 12a; a ROM 13 that stores various kinds of programs; a bus line 14; an input/output portion (I/O) 15; an external memory 16 as a non-volatile memory (for example, the memory 16 is configured with a non-volatile memory such as an EEPROM); communication interfaces (I/F1) 18 and (I/F2) 19 connected with the wired communication network 100 for data communication with the terminal devices 30a and 30b; a communication interface (I/F3) 20 connected with the wireless communication network 101 for data communication with the terminal devices 40a and 40b; and a receiving buffer memory 17 (hereinafter, referred to as a receiving buffer as well) configured to temporarily store print control data received. The I/O 15 is connected with: an input portion 21 configured with a touch panel, press button switches, a numeric keypad, or the like; a display portion 22 configured with an LCD or the like; and a printing portion 23 configured with a widely known inkjet printing mechanism, laser printing mechanism, thermal transfer printing mechanism, dot impact printing mechanism, or the like. It is noted that the communication interfaces 18 and 19 are interfaces for wired communication, and are connected with the wired communication network 100. There are stored in the ROM 13 a print control program 13a, scanner control program 13b, FAX control program 13c, communication program 13d, and communication setting program 13e.

Further, in the aspects, the information-processing system is configured with the MFP 10 and the terminal device 30a connected with the MFP 10 being included therein. The I/O 15 is connected with a scanning portion 24 used for copying and image scanning, and a FAX portion 25 as well as the printing portion 23 as portions to be controlled. Each of operations of the printing portion 23, scanning portion 24, and FAX portion 25 is widely known, and is controlled with a corresponding one of the control programs 13a, 13b, and 13c stored in the ROM 13 being executed in the work memory 12a of the RAM 12 by the CPU 11.

In addition, the MFP 10 is provided with a function of a mail sending and receiving device that sends and receive an e-mail incorporating print image data via an external communication network connected with the wired communication network 100. A program that actualizes the mail sending and receiving function is widely known, and is incorporated in the communication program 13d stored in the ROM 13.

The communication setting program 13e is a program for configuring communication settings for the communication interfaces 18, 19, and 20 of the MFP 10.

Figure 2:
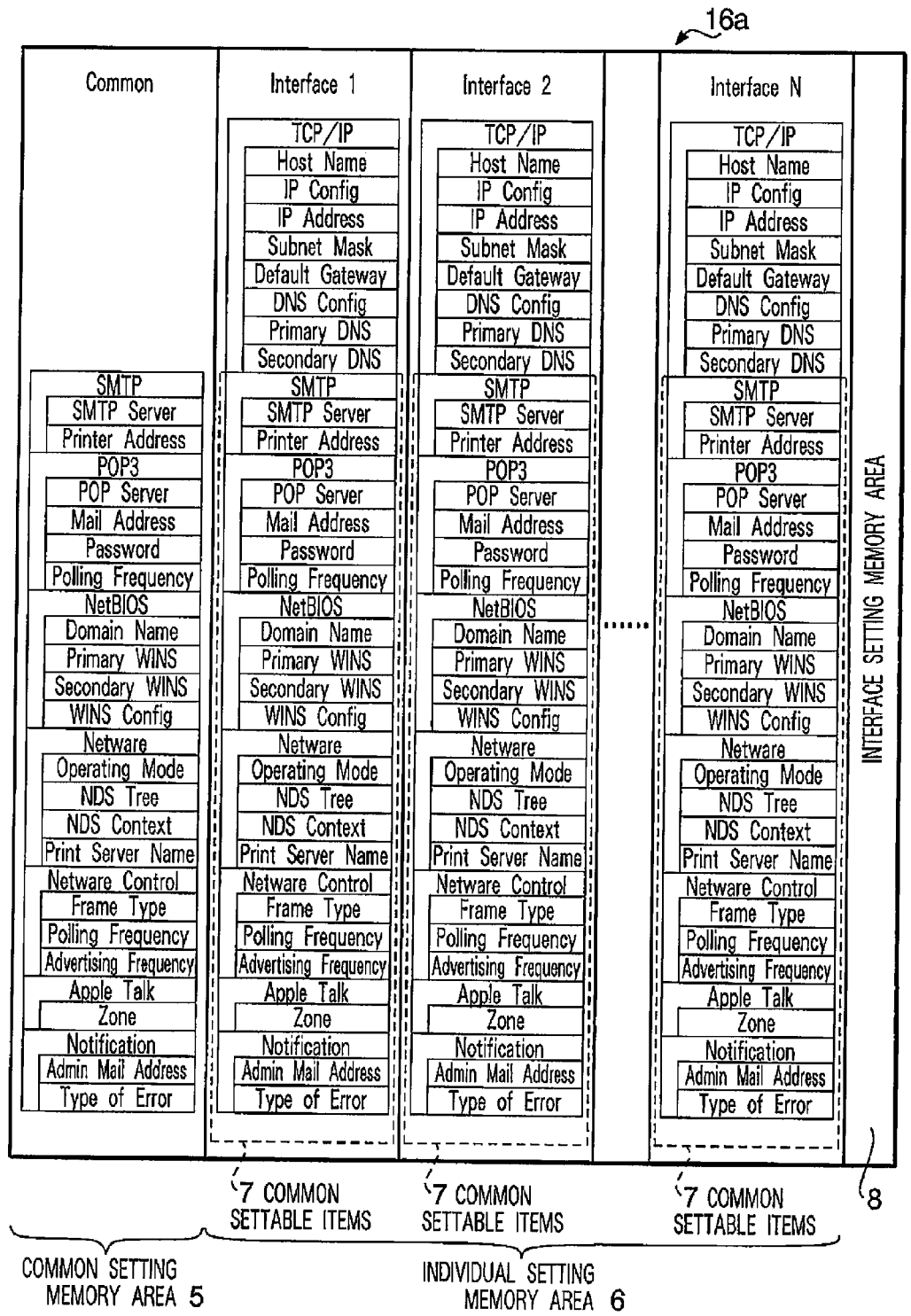
FIG. 2 shows a communication setting memory, provided in the MFP, configured to store setting values therein in accordance with one or more aspects of the present invention.

There are stored in the external memory 16 in the MFP 10 setting values for the communication interfaces 18, 19, and 20. FIG. 2 shows details of the communication setting memory 16a formed in the external memory 16 as a non-volatile memory (e.g., EEPROM) of the MFP 10. There are formed in the communication setting memory 16a a common setting memory area 5 (Common) configured to store setting values to be used as common setting values, and individual setting memory areas 6 (Interface 1, 2, . . . N: N=3 in the case shown in FIG. 1) configured to store individually configurable setting values for each of the interfaces.

There are stored in the common setting memory area 5 setting values regarding common settable items 7 (second setting values: SMTP, POP3, NetBIOS, Netware, Netware Control, Apple Talk, Notification) that can be used in common for the communication interfaces. Furthermore, there are stored in the individual setting memory area 6 for each of the communication interfaces setting values regarding the TCP/IP as first setting value individually configured, in addition to the common settable items 7. In the aspects, the common settable items 7 are previously specified by the communication setting program 13e. However, setting items to be specified as the common settable items 7 (the second setting values) may be determined by a user.

There can be stored in the common settable items 7 in the individual setting memory area 6 for each of the communication interfaces the same setting values as those in the common setting memory area 5, or individual setting values different from those in the common setting memory area 5.

Figure 3:
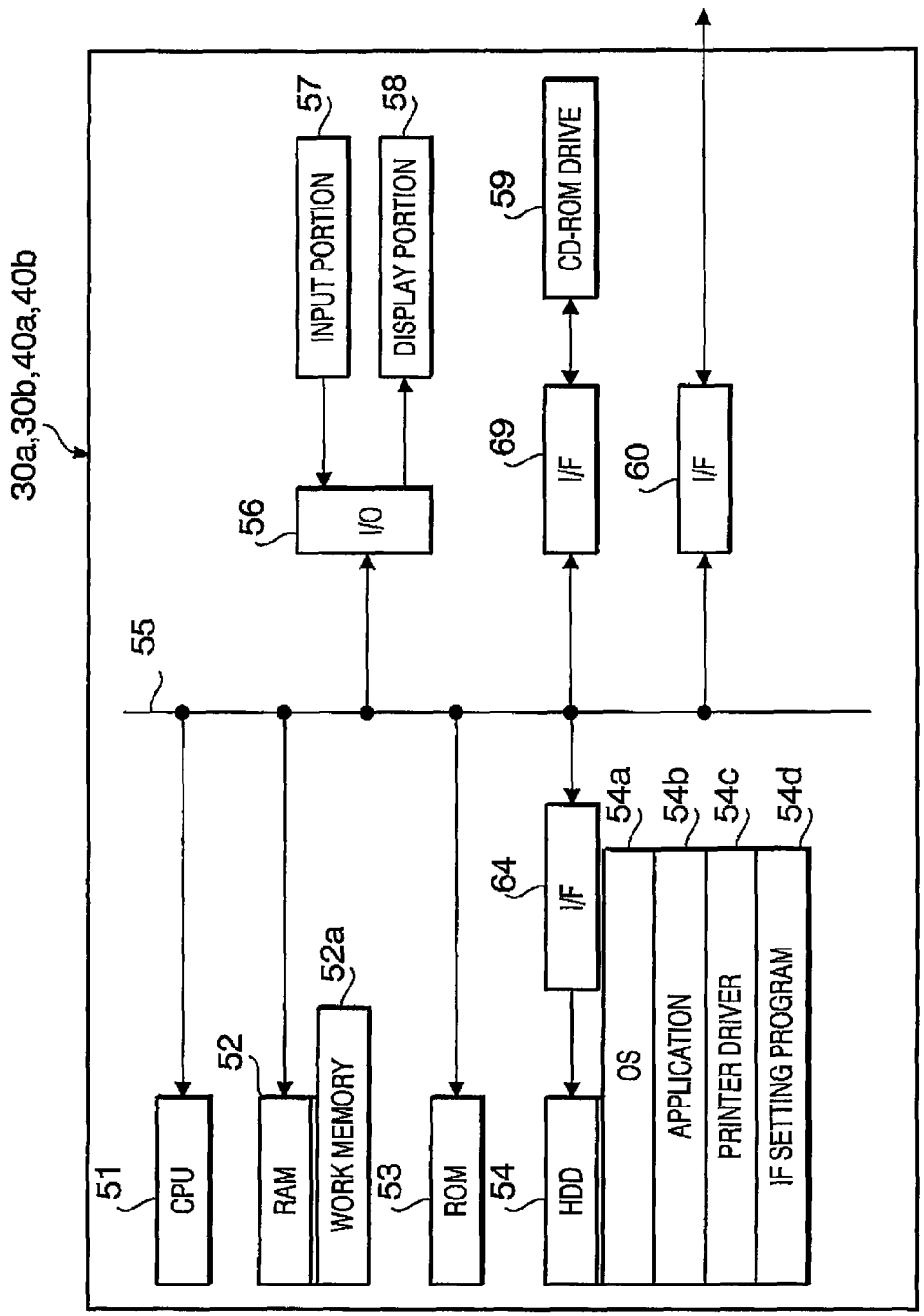
FIG. 3 is a block diagram exemplifying an electrical configuration of a terminal device in accordance with one or more aspects of the present invention.

FIG. 3 is a block diagram showing an electrical configuration of each of the terminal devices 30a, 30b, 40a, and 40b. Each of the terminal devices 30a, 30b, 40a, and 40b has a similar hardware configuration, which is configured as a personal computer (or a work station) provided with: a CPU 51; a RAM 52 including a work memory 52a; a ROM 53 storing various kinds of programs therein; a hard disk drive (HDD) 54 as a storage device; a bus line 55; an input/output portion (I/O) 56; a CD-ROM drive 59; and a communication interface 60 connected with the wired communication network 100 or the wireless communication network 101 for data communication. The HDD 54 and CD-ROM drive 59 are connected to the bus line 55 via the interfaces 64 and 69, respectively. There are installed in the HDD 54 an OS 54a as infrastructure software of each of the terminal devices 30a, 30b, 40a, and 40b, various kinds of application programs 54b that actualize the printing function, and a printer driver 54c that executes a print control instructing process for the MFP 10. The I/O 56 is connected with an input portion 57 configured with a keyboard, a mouse, or the like, and a display portion 58 configured with an LCD, a CRT, or the like.

With an IF setting program 54d stored in the HDD 54 of the terminal device 30a being executed by the CPU 51 of the terminal device 30a, the setting values stored in the external memory 16 of the MFP 10 for the communication interface are read out, and updated in accordance with a user's operation.

Figure 4:
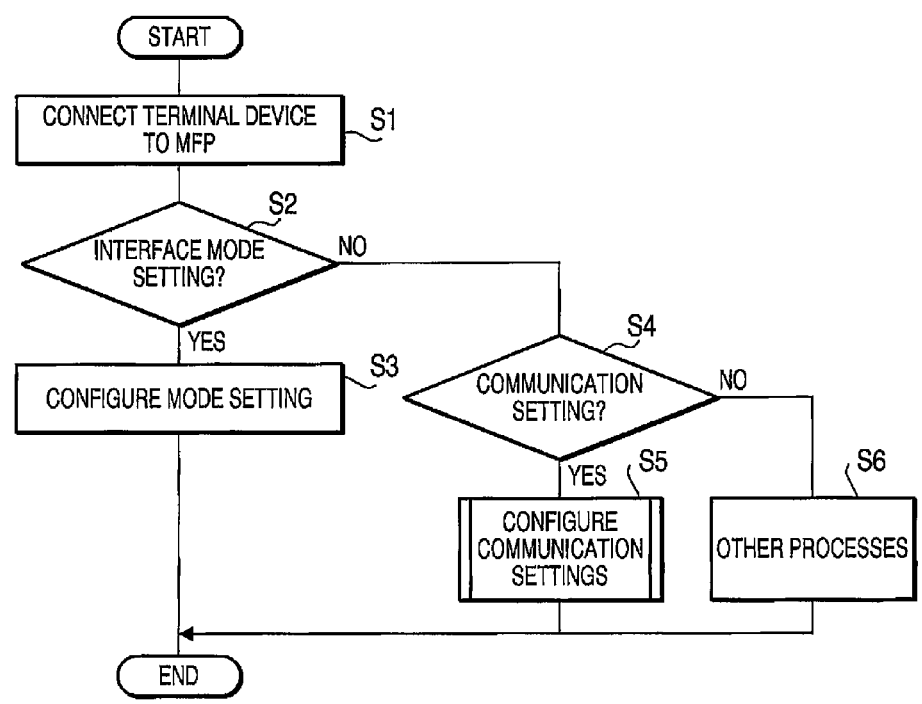
FIG. 4 is a flowchart showing a procedure of a setting process in accordance with one or more aspects of the present invention.
Figure 6:
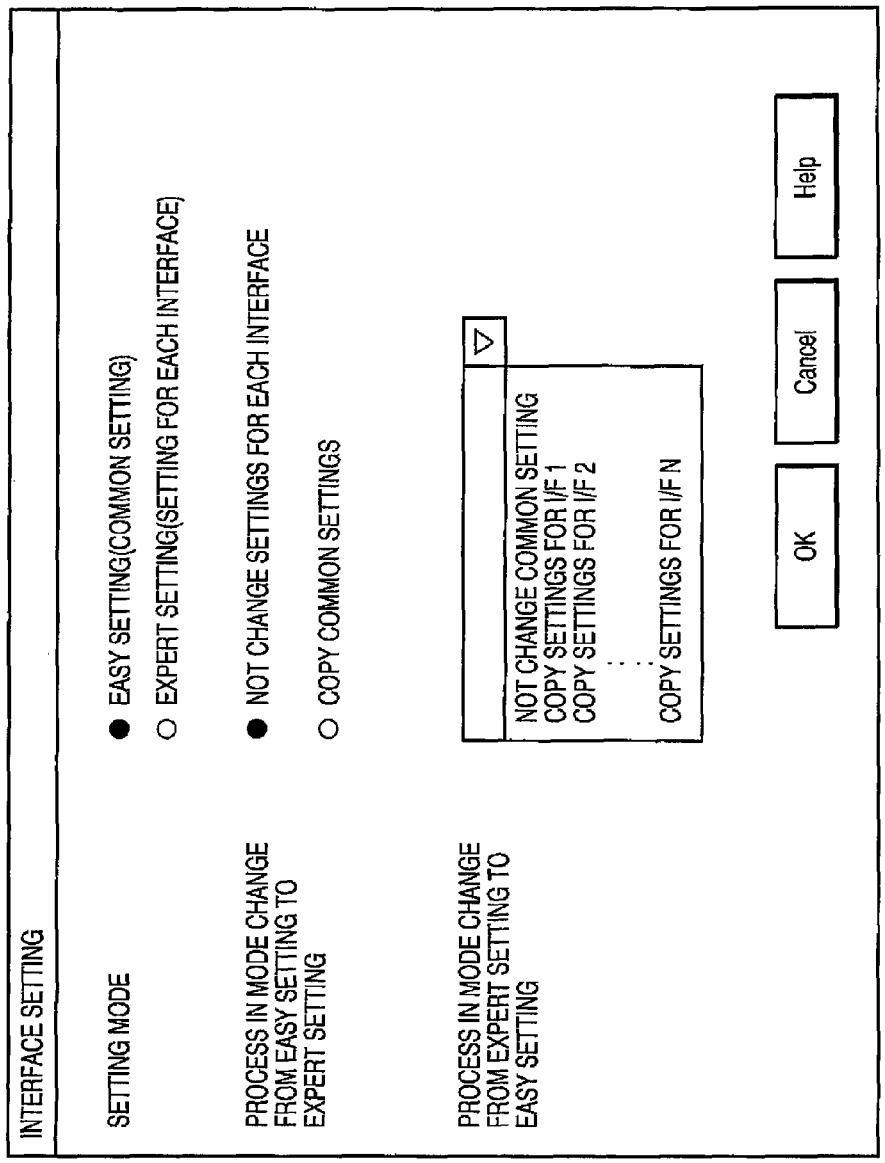
FIG. 6 shows a mode setting screen image for configuring a mode setting for a communication interface in accordance with one or more aspects of the present invention.

A setting process will be described with reference to FIG. 4. When configuring the communication settings for the communication interface, the IF setting program 54d is executed in response to a user's operation. The terminal device 30a receives a node name, IP address, and status information of devices (devices, including the MFP 10, with the printing function) on the network, and then, displays a setting process screen image as shown in FIG. 5 on the display portion 58. At this time, even each of the plurality of communication interfaces provided in the single MFP 10 is treated as an individual device on the display portion 58. In FIG. 5, there are displayed information (I/F1) related to the MFP 10 using the communication interface 18 as a node name "PRN__48B430", information (I/F2) related to the MFP 10 using the communication interface 19 as a node name "PRN__48D97C", and information (I/F3) related to the MFP 10 using the communication interface 20 as a node name "PRN__48D97D". After a device is selected by the user, the terminal device 30a is connected to the MFP 10 (S1). For example, as shown in FIG. 5, when a communication interface (e.g., I/F1) to be set of the MET 10 is specified, and mode setting for the communication interface is then selected (S2: Yes), a mode setting screen image for configuring the mode setting for the communication interface is opened as shown in FIG. 6. For example, with a right button of the mouse as the input portion 57 being clicked by the user in a state where the MFP 10 to be set has been specified, a selecting menu of setting items related to the MFP 10 is displayed. When the user selects a menu item of the mode setting for the communication interface on the selecting menu, the mode setting screen image for configuring the mode setting for the communication interface is displayed as shown in FIG. 6.

FIG. 6 is an example of the mode setting screen image for the communication interface. There are provided as the setting mode an easy setting mode (common setting mode) and an expert setting mode (settings for each of the interfaces). When the easy setting mode is selected, the setting values in the common setting memory area 5 are employed as the common settable items 7 among the setting items for each of the communication interfaces. When the expert setting mode is selected, the setting values in the individual setting memory area 6 for each of the communication interfaces have to be individually configured. With the terminal device 30a being operated by the user, the CPU 51 of the terminal device 30a executes the IF setting program 54d, and the terminal device 30a is connected to the MFP 10. Thereby, with the setting program 13e being executed, the mode setting screen image for the communication interface is displayed.

Setting items "process in mode change from easy setting to expert setting" and "process in mode change from expert setting to easy setting" will be described later.

0032 The mode setting screen image for the communication interface is displayed at the terminal device side, and a setting mode is selected by the user. Thereafter, after an "OK" button is pressed, the selected setting mode is stored into the interface setting memory area 8 in the external memory 16 of the MFP 10. Thereby, one of the "easy setting mode" and "expert setting mode" is set (S3). Thereafter, the setting process shown in FIG. 4 is terminated. It is noted that, by configuring the interface settings for a communication interface (for instance, the I/F1), the same settings are configured for the other communication interfaces (the I/F2 and I/F3) provided in the MFP 10 for which the interface settings have been configured.

When it is not the setting item "interface mode setting" that has been selected in the step of S2 (S2: No), it is judged whether the selected setting item is "communication settings" for the specified communication interface (S4). This judgment is made by checking whether a menu item for configuring the communication settings for the specified communication interface is selected on the selecting menu shown in FIG. 5. When configuring the communication settings for the specified communication interface (S4: Yes), a communication setting screen image is displayed as shown in FIG. 8, so that the communication settings are configured (S5: communication setting process). When the selected setting item is not the "communication settings" for the specified communication interface (S4: No), a process assigned by a user's operation is executed (S6). After completing the step of S5 or S6, the setting process shown in FIG. 4 is terminated.

Figure 7:
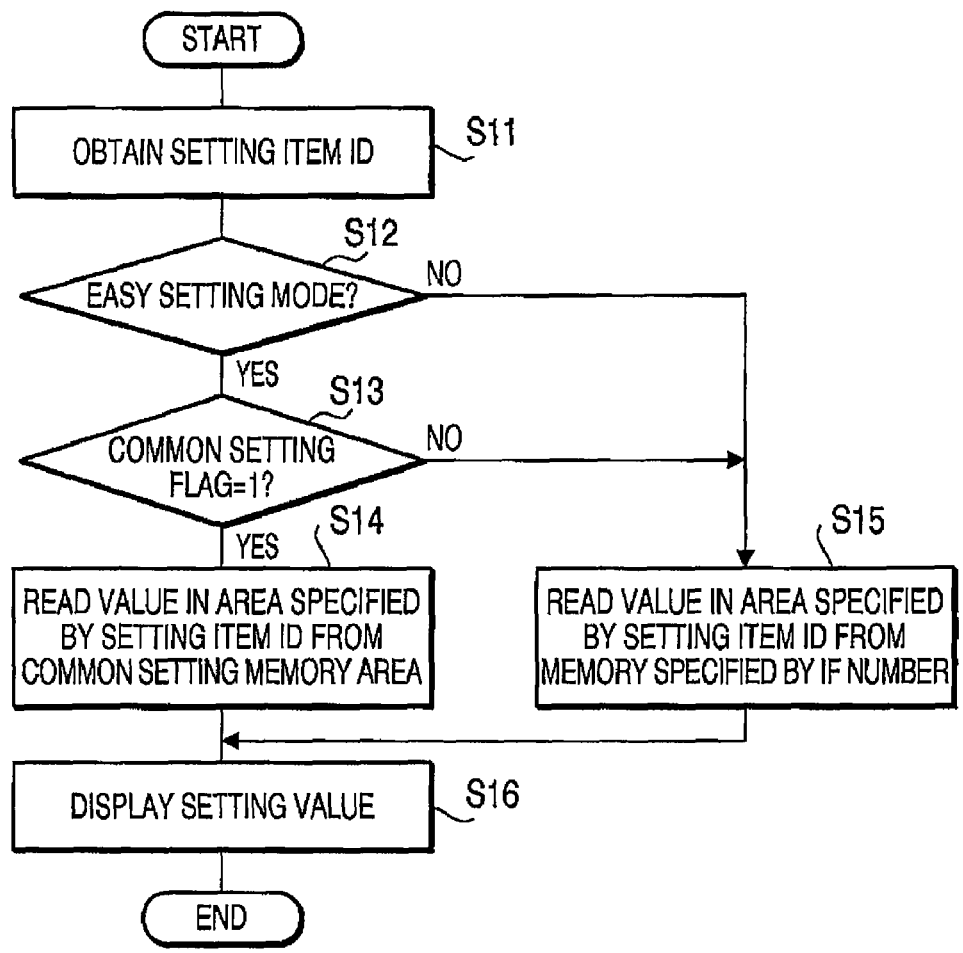
FIG. 7 is a flowchart showing a procedure of a process of reading out each setting value in accordance with one or more aspects of the present invention.

Subsequently, the communication setting process will be explained. Referring to FIG. 7, there will be explained a process of reading out each setting value in the case where the communication setting screen is opened. With the terminal device 30a being operated by the user, the CPU 51 of the terminal device 30a obtains an interface number (for example, interface 1) and a setting item ID (for example, an ID specifying "Host Name" or "IP config" of the TCP/IP) (S11). Namely, the CPU 51 of the terminal device 30a obtains information about for which communication interface the communication setting screen image is opened, and what kinds of setting items there are in the communication setting screen. Then, the CPU 51 of the terminal device 30a obtains a setting value stored in the interface setting memory 8 to judge whether the easy setting mode is set (S12). When the easy setting mode is not set (S12: No), the process goes to a step of S15.

When the easy setting mode is set (S12: Yes), it is judged whether a common setting item flag corresponding to the obtained setting item ID is equal to "1" (S13). The common setting item flag represents whether a corresponding setting item is a common settable item. When a corresponding setting item is a common settable item, the common setting item flag is "1". Meanwhile, when a corresponding setting item is not a common settable item, the common setting item flag is "0". In the aspects, the common setting item flag is previously determined as follows. The common setting item flag of each setting value for the TCP/IP is "0", and the common setting item flag of each setting value for the SMTP and POP3 is "1". When the common setting item flag is "1" (S13: Yes), a corresponding item is an item for which a common setting value can be employed. Therefore, the CPU 51 of the terminal device 30*a* reads a value in an area specified by the setting item ID form the common setting memory area 5 (S14).

When the easy setting mode is not set (S12: No), or when the common setting item flag is not "1" (S13: No), the CPU 51 of the terminal device 30*a* reads a value in an area specified by the setting item ID from a memory area corresponding to the interface number in the individual setting memory area 6 (515). Thereby, for example, the setting value of "SMTP Server" for the SMTP of the interface 1 is read.

The CPU 51 of the terminal device 30*a* performs the aforementioned process for each of the setting values provided on the communication setting screen image opened. Then, all of the setting values obtained, as shown in FIG. 8, are displayed on the display portion 58 of the terminal device 30*a* (S16). FIG. 8 is a setting screen image for the TCP/IP. When the screen image is opened, the aforementioned process is executed. Then, the setting values such as the IP address, Subnet Mask, and the like are obtained from the individual setting memory area 6 for the communication interface to be displayed.

When it is the communication setting screen image for the POP3/SMTP that is displayed on the display portion 58 of the terminal device 30*a*, the setting values are obtained from the common setting memory area 5 to be displayed in the easy setting mode. Meanwhile, in the expert setting mode, the setting values are obtained from the individual setting memory area 6 to be displayed.

It is noted that the MFP 10 carries out a predetermined operation with a corresponding one of the programs 13*a*, 13*b*, 13*c*, 13*d*, and 13*e* being run by the CPU 11 of the MFP 10. At this time, in a similar manner, the setting values are read out in accordance with the setting mode stored in the interface setting memory area 8. For instance, when the MFP 10 inquires a POP3 server about a received mail, it is checked whether the setting mode is the easy setting mode. When the setting mode is the easy setting mode, since the address of the POP3 server is a common setting item, the address of the POP3 server is read out from the common setting memory area 5.

Next, a process of storing a setting value will be explained with reference to FIG. 9. When the user inputs the setting values on the communication setting screen image displayed on the display portion 58 of the terminal device 30*a*, and presses an "OK" button by operating the terminal device 30*a*, the CPU 51 of the terminal devices 30*a* obtains an interface number, setting item ID, and setting value related to the communication setting screen image opened at the side of the terminal device 30*a* (S21). The CPU 51 of the terminal device 30*a* obtains the setting value stored in the interface setting memory area 8 to judge whether the easy setting mode is set (S22). When the easy setting mode is not set (S22: No), the process goes to a step of S25.

When the easy setting mode is set (S22: Yes), it is judged whether the common setting item flag corresponding to the setting item ID obtained is "1" (S23). When the common setting item flag is "1" (S23: Yes), a common setting value is employed for a setting item corresponding to the setting item ID obtained. Therefore, the setting value is stored in an area, specified by the setting item ID, in the common setting memory area 5 of the external memory 16 of the MFP 10 (S24).

When the easy setting mode is not set (S22: No), or when the common setting item flag is not "1" (S23: No), the CPU 51 of the terminal device 30*a* outputs the setting value as a value to be stored in an area specified by the interface number and setting item ID to the MFP 10. The CPU 11 of the MFP 10 stores the setting value received into the specified area of the individual setting memory area 6 (S25).

Figure 10:
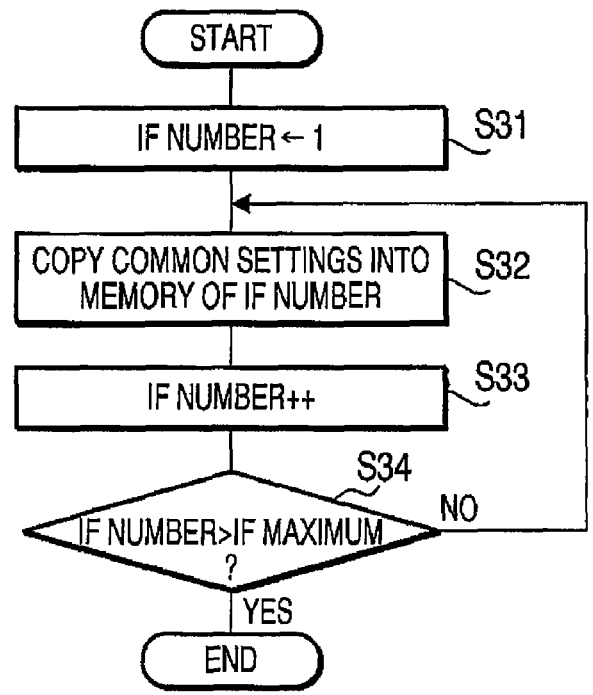
FIG. 10 is a flowchart showing a procedure of a process in mode change to an expert setting mode in accordance with one or more aspects of the present invention.

With reference to FIG. 10, there will be explained a case where, on the mode setting screen for configuring the mode setting for the communication interface shown in FIG. 6, the setting mode has been changed from the easy setting mode to the expert setting mode, and a setting option "copy common settings" is selected. In this case, with the "OK" button being pressed by the user on the mode setting screen, the CPU 11 of the MFP 10 performs a process shown in FIG. 10.

A setting item "process in mode change from easy setting to expert setting" in FIG. 6 is an item for determining whether setting values in the common setting memory area 5 is reflected in setting values in the common settable items 7 for each of the communication interfaces when the setting mode has been changed from the easy setting mode to the expert setting mode. When the setting option "copy common settings" is selected in the case where the setting mode has been changed from the easy setting mode to the expert setting mode, the setting values in the common setting memory area 5 are copied into the common settable items 7 for each of the communication interfaces. It is noted that, when the easy setting mode is set as the setting mode, even though the setting option "copy common settings" is selected for the setting item "process in mode change from easy setting to expert setting", the setting values in the common setting memory area 5 are not copied into the common settable items 7 for any of the communication interfaces. In addition, even though the setting mode has been changed into the expert setting mode, when a setting option "not change settings for each interface" is selected for the setting item "process in mode change from easy setting to expert setting", only the setting mode is changed, and the setting values are not copied.

When the user presses the "OK" button on the mode setting screen for the communication interface, the CPU 11 of the MFP 10 sets "1" as the interface (IF) number (S31). This process is a process for specifying for which communication interface the individual setting memory area 6 is to be changed. Then, the common settings are copied into a memory of the specified IF number (S32). Namely, the common settings are copied into a memory of the interface 1. Next, the CPU 11 of the MFP 10 increments the IF number (S33). Subsequently, the CPU 11 of the MFP 10 judges whether the IF number exceeds an IF maximum (the IF maximum is the number of the communication interfaces provided in the Mn) 10) (S34). When the IF number does not exceed the IF maximum (S34: No), the process goes back to the step of S32, and the common settings are copied into a memory of the next IF number (S32).

When the IF number exceeds the IF maximum (S34: Yes), since the common settings has completely been copied into the memories for all of the communication interfaces provided in the UP 10, the process is terminated. That is, in the aforementioned process, the CPU 11 of the MFP 10 copies the setting values from the common setting memory area 6 into the common settable items 7 of the individual setting memory areas 6 for all of the communication interfaces in sequence from the interface 1.

Figure 11:
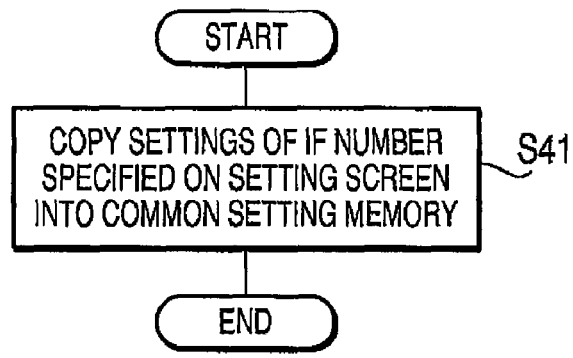
FIG. 11 is a flowchart showing a procedure of a process in mode change to an expert setting mode in accordance with one or more aspects of the present invention.

Referring to FIG. 11, there will be explained a case where the setting values in the individual setting memory area 6 of a specified communication interface are reflected in the setting values in the common setting memory area 5 when the setting mode is changed from the expert setting mode to the easy setting mode. In this case, with the "OK" button being pressed by the user on the mode setting screen for the communication interface, the CPU 11 of the MFP 10 performs a process as shown in FIG. 11.

A setting item "process in mode change from expert setting to easy setting" in FIG. 6 is an item for specifying for which communication interface the setting values are to be reflected in the common settings when the setting mode has been changed from the expert setting mode to the easy setting mode. For example, when a setting option "copy settings for I/F1" is selected, the setting values in the common settable items 7 of the interface 1 are copied into the common setting memory area 5. Namely, the CPU 11 of the MFP 10 copies the settings of the interface number specified on the setting screen into the common setting memory area 5 (S41). It is noted that, when the expert setting mode is set as the setting mode, even though the setting option "copy settings for I/F1" is selected for the setting item "process in mode change from expert setting to easy setting", the setting values are not copied from the common settable items 7 to the common setting memory area 5. In addition, even though the setting mode has been changed to the easy setting mode, when a setting option "not change common settings" is selected for the setting item "process in mode change from expert setting to easy setting", only the setting mode is changed, and the setting values are not copied.

FIG. 12 schematically shows the aforementioned process in a summarized manner. When the expert setting mode is selected as the setting mode, the setting values stored in the individual setting memory area 6 for a specified communication interface, for example, first setting values and second setting values for the I/F1 are read out and displayed on the display portion 58 of the terminal device 30a.

When the easy setting mode is selected as the setting mode, the first setting values are read out from the individual setting memory area 6 of a specified communication interface, and are displayed on the display portion 58 of the terminal device 30a. Meanwhile, the second setting values are read out from the common setting memory area 5, and are displayed on the display portion 58 of the terminal device 30a.

In addition, when the setting mode has been changed from the easy setting mode to the expert setting mode, the communication setting program 13e is executed, and the second setting values stored in the common setting memory area 5 are reflected in the second setting values in the individual setting memory area 6 for each of the communication interfaces so that each of the setting values in the communication setting memory 16a are rewritten.

Further, when the setting mode has been changed from the expert setting mode to the easy setting mode, the second setting values in the individual setting memory area 6 of a specified communication interface are reflected in the second setting values in the common setting memory area 5.

As described above, since the information-processing device according to the present invention includes the common setting memory area 5, the settings are configured in common for the communication interfaces. Therefore, a load of the user in configuring the settings for each of the communication interfaces can be reduced.

In the aspects of the present invention, the user operates the terminal device 30a to configure the settings for the communication interfaces 18, 19, and 20 of the MFP 10. However, the information-processing system may be configured such that the user operates the input portion 21 of the MFP 10 in accordance with information displayed on the display portion 22 of the MFP 10 to configure the settings therefore.

The MFP 10 provided with the plurality of communication interfaces 18, 19, and 20 has been explained as the information-processing device in the information-processing system in the aforementioned aspects. However, the information-processing device may be a computer, FAX machine, printer, or the like that includes a plurality of communication interface. In this case, in a similar manner, settings are configured in common for the communication interfaces, so that a load of the user in configuring the settings for the communication interfaces can be reduced. In addition, the common settable items 7 of an arbitrary communication interface (e.g., the interface 1) as previously set by the user may be employed as the common setting memory area 5. In this case, when setting values for another communication interface (for example, the interface 2) are read out, the setting values are read out from the common setting memory area 7 of the interface 1 and the individual setting memory area 6 of the interface 2 in the easy setting mode. Further, the setting values in the setting memory area that have been read out are to be updated.

In addition, when the MFP 10 does not include the common setting memory area 5, the easy setting mode is set as the setting mode, and setting values in the common settable items are to be updated, all updated setting values may be reflected in the common settable items 7. Specifically, when the setting values are read out, regardless of the setting mode, the setting values for a communication interface (for example, the interface 1), which have been specified as a communication interface for which the setting values are to be read out, are read out. Then, when the setting values read out are instructed to be changed (in FIG. 8, when setting values for predetermined setting items are inputted from the input portion 57 to be changed, and the "OK" button is pressed), an updating process for updating the setting values is performed in accordance with FIG. 13.

Figure 9:
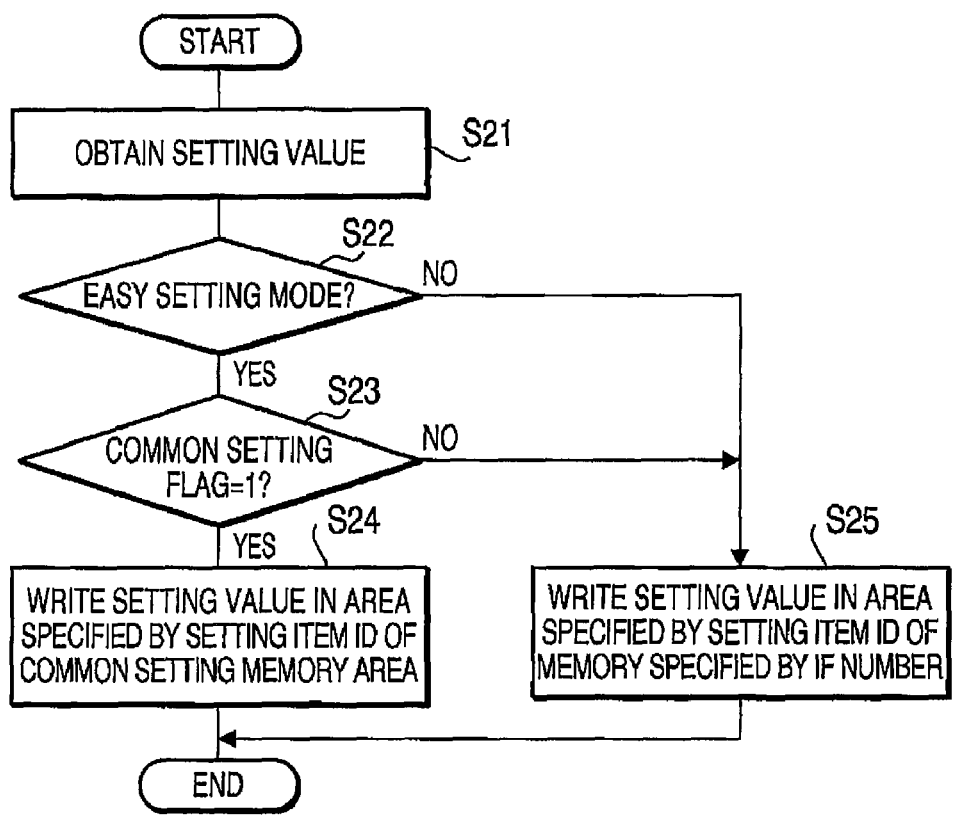
FIG. 9 is a flowchart showing a procedure of a process of writing a setting value in accordance with one or more aspects of the present invention.

Namely, as aforementioned, after the same operations in steps of S51 to S53 as those in the steps of S21 to S23 in FIG. 9 are performed, when it is judged that the easy setting mode is selected in the step of S52, and it is judged that the common setting item flag is "1" in the step of S53 (i.e., a setting value obtained in the step of S51 is a value for one of the common settable items) (S52: Yes, and S53: Yes), the process goes to a step of S54 to write the setting value in an area specified by the setting item ID of the common settable items 7 corresponding to each of the communication interfaces (the interfaces 1 to 3, N=3).

On the other hand, when it is not judged that the easy setting mode is selected in the step of S52 (that is, when the expert setting mode is selected) (S52: No), or when it is not judged that the common setting item flag is "1" in the step of S53 (that is, the setting value is not a value for one of the common settable items) (S53: No), the process goes to a step of S55 to write the setting value in an area specified by the setting item ID of an individual setting memory area 6 corresponding to a communication interface (for example, the interface 1) specified as a communication interface for which the settings are to be changed.

The present invention can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present invention. However, it should be recognized that the present invention can be practiced without resorting to the details specifically set forth. In other instances, well known processing structures have not been described in detail, in order not to unnecessarily obscure the present invention.

Only exemplary embodiments of the present invention and but a few examples of its versatility are shown and described in the present disclosure, It is to be understood that the present invention is capable of use in various other combinations and environments and is capable of changes or modifications within the scope of the inventive concept as expressed herein.

What is claimed is:

1. An information-processing system, comprising:
   an information-processing device including a plurality of communication interfaces;
   a first storing system configured to store first setting values to be configured for each of the plurality of communication interfaces and second setting values configurable in common for the plurality of communication interfaces for each of the plurality of communication interfaces;
   a second storing system configured to store the second setting values;
   a setting mode determining system configured to select one of a first setting mode where setting values are configured for each of the plurality of communication interfaces and a second setting mode where setting values configurable in common are configured in common for the plurality of communication interfaces;
   a reading system configured to read out a setting value from the first storing system and second storing system; and
   an updating system configured to update the setting value read out by the reading system
   wherein the reading system is configured to read out at least one of the first setting values stored in the first storing system and the second setting values stored in the first storing system, in response to the first setting mode being selected by the setting mode determining system, and
   wherein the reading system is configured to read out at least one of the first setting values stored in the first storing system and the second setting values stored in the second storing system, in response to the second setting mode being selected by the setting mode determining system.

2. The information-processing system according to claim 1, further comprising a first reflecting system configured to reflect the second setting values stored in the second storing system in the second setting values stored in the first storing system for each of the plurality of communication interfaces in response to the setting mode being changed from the second setting mode to the first setting mode.

3. The information-processing system according to claim 1, further comprising a second reflecting system configured to reflect the second setting values stored in the first storing system in the second setting values stored in the second storing system in response to the setting mode being changed from the first setting mode to the second setting mode.

4. The information-processing system according to claim 3, further comprising a reflected target determining system configured to specify a communication interface of which the second setting values stored in the first storing system are to be reflected in the second setting values stored in the second storing system,
   wherein the second setting values stored in the second storing system to be reflected by the second reflecting system are the second setting values of the communication interface specified by the reflected target determining system stored in the first storing system.

5. The information-processing system according to claim 2, further comprising a second reflecting system configured to reflect the second setting values stored in the first storing system in the second setting values stored in the second storing system in response to the setting mode being changed from the first setting mode to the second setting mode.

6. The information-processing system according to claim 5, further comprising a reflected target determining system configured to specify a communication interface of which the second setting values stored in the first storing system are to be reflected in the second setting values stored in the second storing system,
   wherein the second setting values stored in the second storing system to be reflected by the second reflecting system are the second setting values of the communication interface specified by the reflected target determining system stored in the first storing system.

7. An information-processing system, comprising:
   an information-processing device including a plurality of communication interfaces;
   a first storing system configured to store first setting values to be configured for each of the plurality of communication interfaces and second setting values configurable in common for the plurality of communication interfaces associated with one of the plurality of communication interfaces;
   a second storing system configured to store the first setting values and the second setting values associated with another one of the plurality of communication interfaces;
   a setting mode determining system configured to select one of a first setting mode where setting values are configured for each of the plurality of communication interfaces and a second setting mode where setting values configurable in common are configured in common for the plurality of communication interfaces;
   a reading system configured to read out one of the first setting values and second setting values from the first storing system; and
   an updating system configured to update the setting value read out by the reading system,
   wherein the updating system is configured to update the setting values stored in the first storing system, in response to the first setting mode being selected by the setting mode determining system, and
   wherein the updating system is configured to update the second setting values stored in the first storing system and the second setting values stored in the second storing system, in response to the second setting mode being selected by the setting mode determining system and the second setting values being specified as the setting values to be updated by the updating system.

8. An information-processing system, comprising:
   an information-processing device including a plurality of communication interfaces;

a first storing system configured to store first setting values to be configured for each of the plurality of communication interfaces and second setting values configurable in common for the plurality of communication interfaces for each of the plurality of communication interfaces;

a second storing system configured to store the second setting values;

a setting mode determining system configured to select one of a first setting mode where setting values are configured for each of the plurality of communication interfaces and a second setting mode where setting values configurable in common are configured in common for the plurality of communication interfaces;

a reading system configured to read out a setting value from the first storing system and second storing system; and an updating system configured to update the setting value read out by the reading system, wherein the reading system is configured to read out setting values from the first storing system, in response to the first setting mode being selected by the setting mode determining system, and wherein the reading system is configured to read out at least one of the first setting values stored in the first storing system and the second setting values stored in the second storing system, in response to the second setting mode being selected by the setting mode determining system.

* * * * *